United States Patent
Ho

(10) Patent No.: US 6,515,581 B1
(45) Date of Patent: Feb. 4, 2003

(54) WIRELESS VEHICLE REVERSAL MONITORING DEVICE

(75) Inventor: Chao-Ting Ho, Hsinchu (TW)

(73) Assignee: Photic Electronics Co., Ltd., Jubei (TW)

(*) Notice: Subject to any disclaimer, the term of this patent is extended or adjusted under 35 U.S.C. 154(b) by 0 days.

(21) Appl. No.: 09/925,378

(22) Filed: Aug. 10, 2001

(51) Int. Cl.$^7$ .................................................. B60Q 1/00
(52) U.S. Cl. ..................... 340/425.5; 340/438; 340/937; 348/113; 348/148
(58) Field of Search .............................. 340/425.5, 426, 340/937, 932.2, 438, 461; 348/148, 36, 118, 113, 149, 151, 419, 207; 359/366

(56) References Cited

U.S. PATENT DOCUMENTS

| | | | | |
|---|---|---|---|---|
| 5,144,661 A | * | 9/1992 | Shamosh et al. ............ 340/540 |
| 5,289,321 A | * | 2/1994 | Secor ........................... 348/148 |
| 5,648,835 A | * | 7/1997 | Uzawa ........................... 348/36 |
| 6,035,212 A | * | 3/2000 | Rostoken et al. ........... 455/522 |
| 6,078,355 A | * | 6/2000 | Zengel ......................... 348/148 |
| 6,151,065 A | * | 11/2000 | Steed et al. ................. 348/148 |
| 6,320,612 B1 | * | 11/2001 | Young ......................... 348/148 |

* cited by examiner

*Primary Examiner*—Daryl Pope
(74) *Attorney, Agent, or Firm*—Rosenberg, Klein & Lee

(57) ABSTRACT

A wireless vehicle reversal monitoring device comprised of an image acquisition unit and an image control display processing system that eliminates the inconveniences and perplexities of wired installations. In addition, the present invention is theft-proof in that it is easily uninstalled, ensures increased safety during vehicle reversal, and is of greater product value.

1 Claim, 4 Drawing Sheets

WIRELESS VEHICLE REVERSAL MONITORING DEVICE

BACKGROUND OF THE INVENTION

1) Field of the Invention

The invention herein relates to a wireless vehicle reversal monitoring device comprised of an image acquisition unit and an image control display processing system that provides a wireless vehicle reversal monitoring device of higher product utility and increased safety when a vehicle so equipped is in the process of reversing.

2) Description of the Prior Art

As is well-known, the rear-view mirrors at the left and right sides of a vehicle are utilized to assist the driver while a vehicle is reversing; however, the field of vision of the rear-view mirrors is limited and due to the numerous blind angles present, vehicle reversal based on such a limited field of vision can be quite dangerous; to improve the conventional rear-view mirror-based vehicle reversal model, vehicle reversal monitoring devices were introduced on the market; the first generation reversal monitoring devices were hard-wired installations and users had to expend considerable effort concealing cables which, furthermore, spoiled the appearance of vehicle interiors; moreover, vehicle reversal monitors mounted on vehicle exteriors were often damaged and when the conventional wired-type vehicle reversal monitoring devices were utilized on trailered vehicles and other similar heavy vehicles, every separation of the tractor truck from the trailer required the reinstallation of wiring several dozen meters in length which caused great user difficulty. To overcome the existent shortcomings of the conventional product, while increasing utilization convenience and practicality, the inventor of the invention herein addressed the said shortcomings based on many years of experience gained while engaged in the related specialized fields by conducting research and development as well as repeated testing and refinement to ensure that the invention herein was capable of optimal utility, which culminated in the completion of the wireless vehicle reversal monitoring device of the present invention.

SUMMARY OF THE INVENTION

Therefore, the primary objective of the invention herein is to provide a wireless vehicle reversal monitoring device that eliminates the inconveniences and perplexities of wired installations. In addition, the present invention is theft-proof in that it is easily uninstalled, ensures increased safety during vehicle reversal, and is of greater product value.

To enable the examination committee to further understand the structural characteristics and technological content as well as the advantages and innovative features of the invention herein, the brief description of the drawings below is followed by the detailed description of the invention herein.

DETAILED DESCRIPTION OF THE INVENTION

Figure 1:
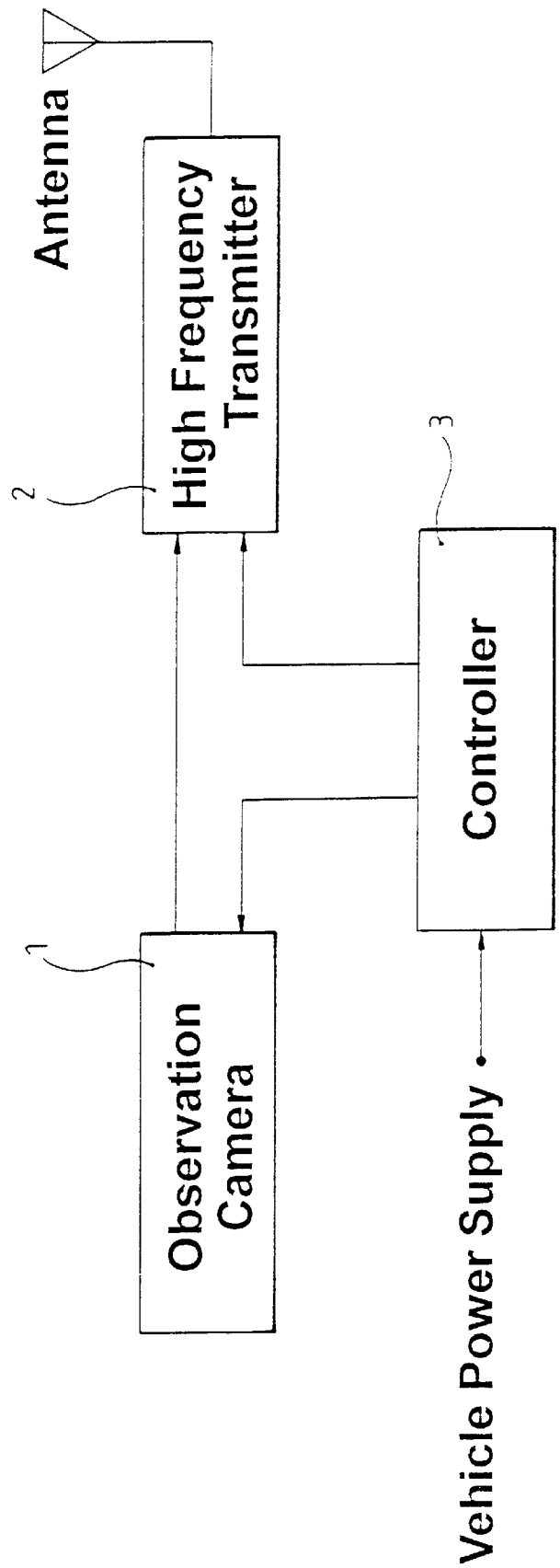
FIG. 1 is a block diagram of the image acquisition unit of the invention herein.

The invention herein provides a wireless vehicle reversal monitoring device comprised of an image acquisition unit and an image control display processing system, wherein the image acquisition unit, referring to FIG. 1, consists of an observation camera 1, a high frequency transmitter 2, and a controller 3; the said controller 3 has control over the switching on of the observation camera 1, control over the switching on of the high frequency transmitter 2, and control over the channel selector of the high frequency transmitter 2; (the said high frequency transmitter 2 is a commonly used conventional wireless transmission system and, furthermore, the observation camera 1 is a commonly used conventional video camera system, the principles and utilization of which are familiar to those skilled in the related technologies).

Figure 2:
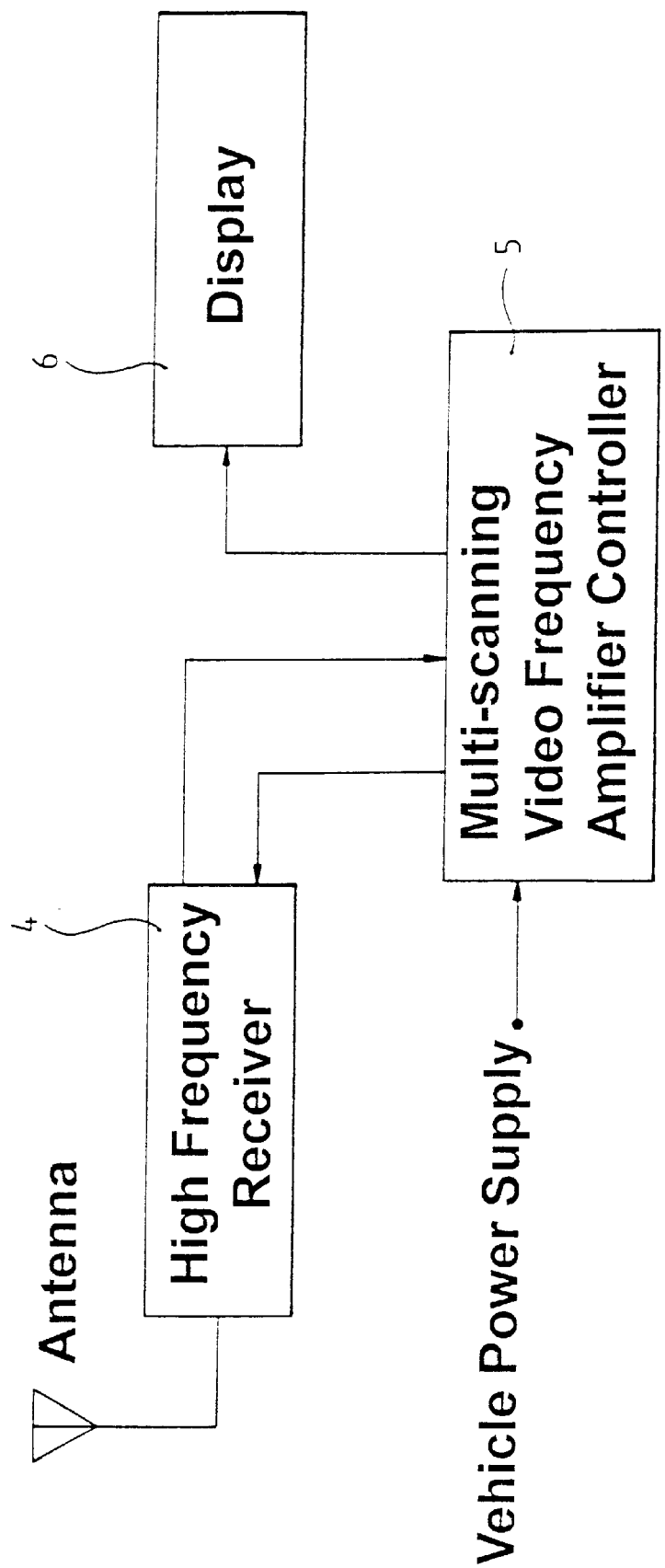
FIG. 2 is a block diagram of the image control display processing system of the invention herein.

Referring to FIG. 2, the image control display processing system consists of a high frequency receiver 4, a multi-scanning video frequency amplifier controller 5, and a display 6; in addition to having control over the switching on of the high frequency receiver 4 and the channel selector of the high frequency receiver 4, the said multi-scanning video frequency amplifier controller 5 is capable of automatically adapting to the different video transmission output of various video signal sources, enhancing inputted images, and eliminating interference artifacts to provide an optimal signal source for the display 6.

Figure 3:
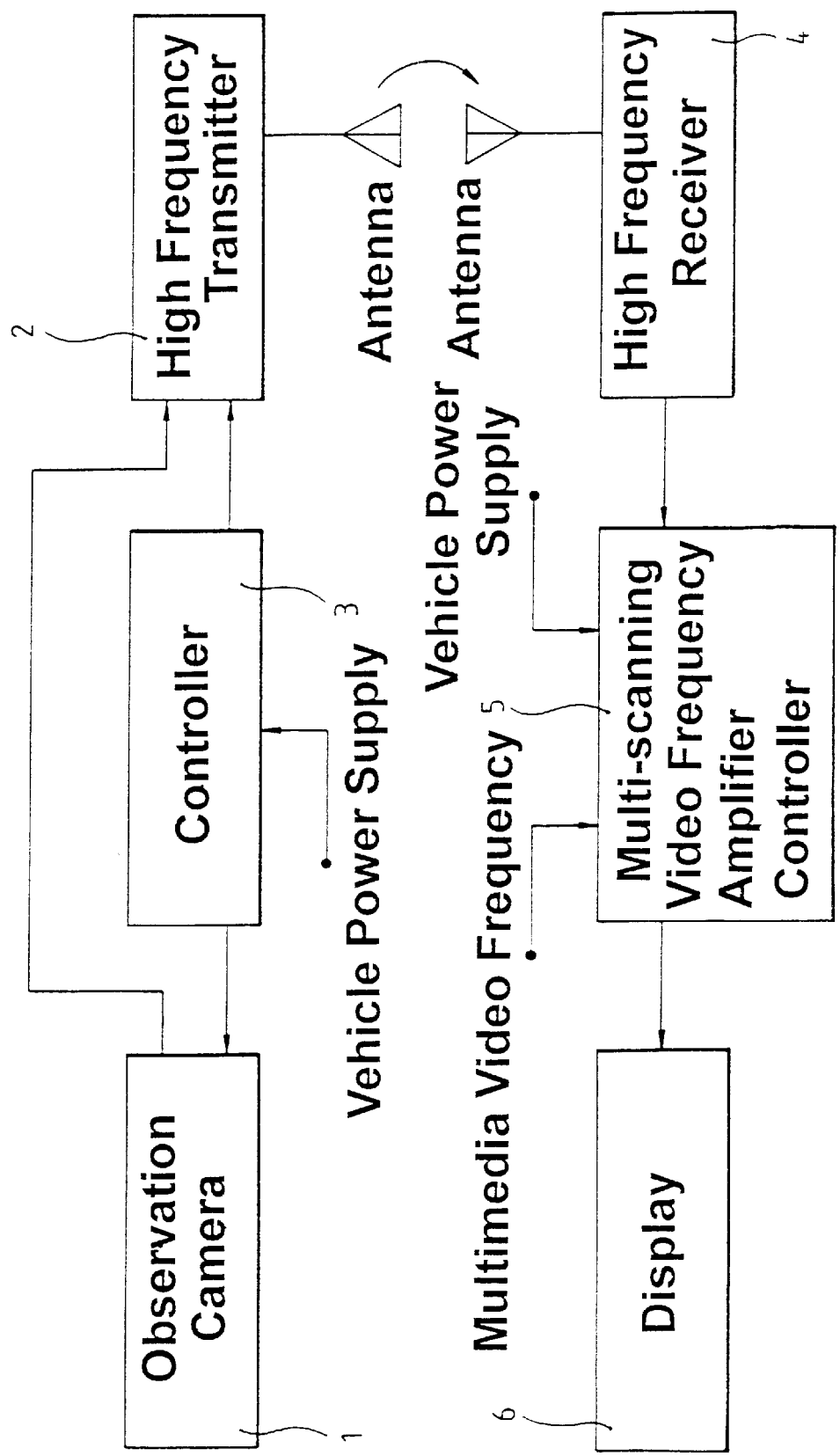
FIG. 3 is a flow chart illustrating the operation of the invention herein.

As indicated in FIG. 3, when a vehicle equipped with the present invention is in reverse gear and backing up, a vehicle power supply signal is inputted to the controller 3 and the multi-scanning video frequency amplifier controller 5, following which power is switched on to the observation camera 1 and the high frequency transmitter 2, the observation camera 1 next provides images that show the view to the rear of the vehicle and sends the video signals to the high frequency transmitter 2, and then the high frequency transmitter 2 propagates the video signal wirelessly via radio frequency waves. The high frequency receiver 4 detects the video signals containing images at the rear of the vehicle and relays it to the said multi-scanning video frequency amplifier controller 5 and after the said multi-scanning video frequency amplifier controller 5 filters out interference artifacts and amplifies the images taken at the rear of the vehicle, the video signals are sent to the display 6 so the driver can clearly see images showing the view at the rear of vehicle to thereby augment vehicle reversing safety.

Figure 4:
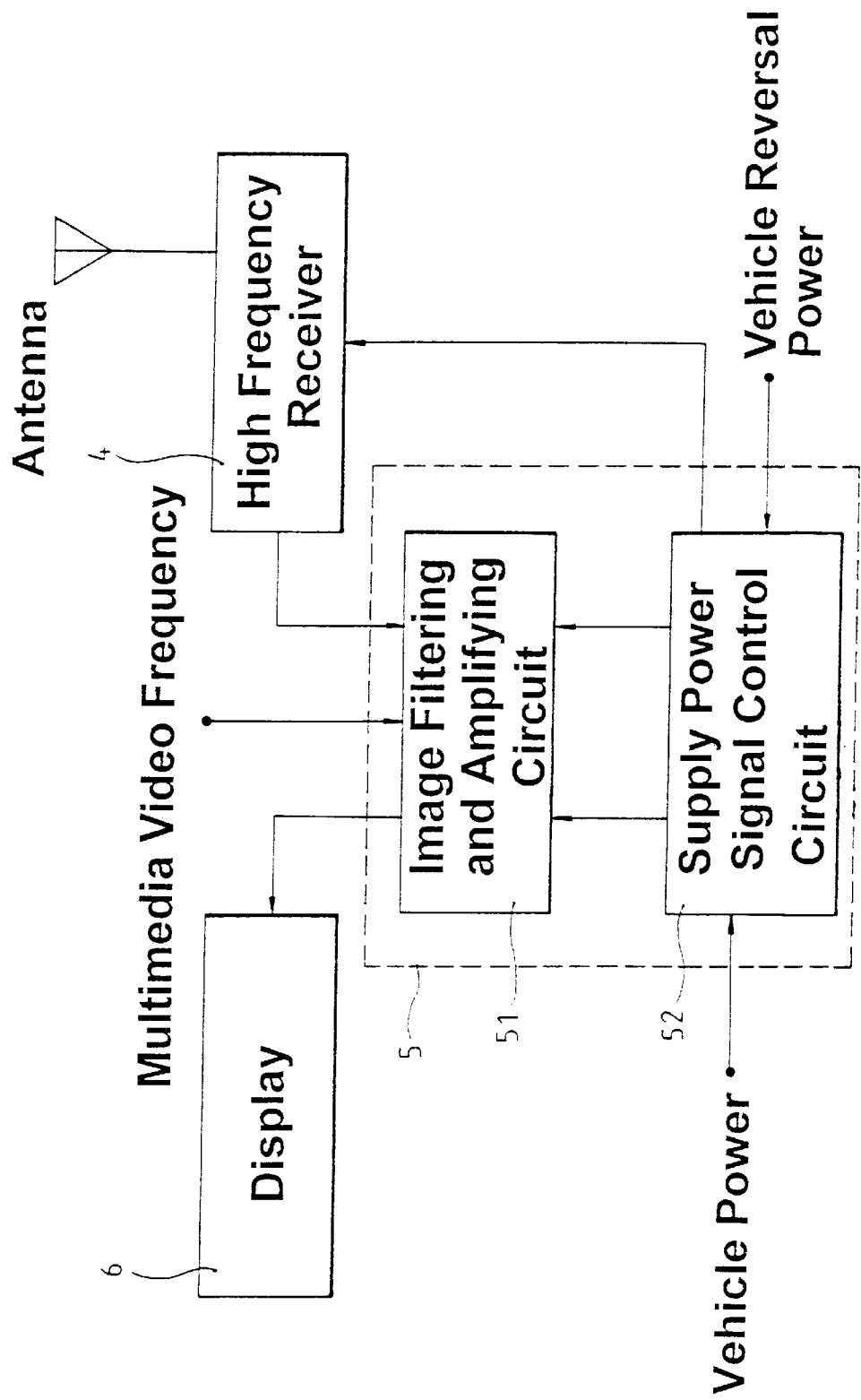
FIG. 4 is a flow chart illustrating the operation of the multi-scanning video frequency amplifier controller of the invention herein.

Referring to FIG. 4, the flow chart illustrating the operation of the multi-scanning video frequency amplifier controller 5, the said multi-scanning video frequency amplifier controller 5 also has an image filtering and amplifying circuit 51 as well as a power signal control circuit 52 such that when the vehicle is not in the process of reversal, it is capable of receiving multimedia video imaging signals from other sources in the vehicle and functions as a signal amplifier; when the vehicle is placed in reverse and the vehicle reversal power signal is inputted, the high frequency receiver 4 is immediately switched on, processing is re-directed to video signals sourced from the rear of the vehicle, and rear-of-vehicle imaging is sent to the display 6.

Following the assembly of the said structure that provides for a wireless vehicle reversal monitoring device, when compared to the laborious wired installation utilized by the conventional technology, the wireless separate-type arrangement of the image acquisition unit and the image control display processing system of the present invention is more convenient and practical to install. In addition, when a vehicle so equipped is not in the process of reversing, the invention herein functions as a signal amplifier for other multimedia video imaging signal sources and, furthermore, is theft-proof in that it is easily uninstalled, ensures increased safety during vehicle reversal, and is of greater product value.

The preceding detailed description elaborates one feasible embodiment of the invention herein; however, the said embodiment shall not be construed as a limitation of the scope and claims of the present invention and, furthermore, all adaptations and modifications based on technological spirit of the present invention shall remain within the scope and claims of the invention herein.

In summation of the foregoing section, since the invention herein is of an original spatial arrangement and capable of achieving even greater utility and performance as well as higher practical value and, furthermore, similar or identical product disclosures have not been observed on the market, the invention herein is submitted to the examination committee for review in application for the granting of the commensurate patent rights.

What is claimed is:

1. A wireless vehicle reversal monitoring device comprised of an image acquisition unit and an image control display processing system installed in a vehicle, of which:

said image acquisition unit consists of an observation camera, a high frequency transmitter, and a controller; said controller having control over switching on of said observation camera, control over switching on of said high frequency transmitter, and control over a channel selector of said high frequency transmitter;

said image control display processing system consists of a high frequency receiver for receiving radio frequency signals from said high frequency transmitter, a multi-scanning video frequency amplifier controller, and a display; said multi-scanning video frequency amplifier controller having control over switching on of the said high frequency receiver and a channel selector of the said high frequency receiver, the said multi-scanning video frequency amplifier controller automatically adapting to different video transmission outputs of various video signal sources, enhancing input images, and eliminating interference artifacts to provide an optimal signal source for said display;

responsive to said vehicle being in a reverse gear and backing up, a vehicle power supply signal is input to said controller and said multi-scanning video frequency amplifier controller, following which power is switched on to said observation camera and said high frequency transmitter, said observation camera next providing video signals representing images that show a rear view of said vehicle and sends said video signals to said high frequency transmitter, and then said high frequency transmitter propagates said video signals wirelessly via said radio frequency signals; said high frequency receiver detects said propagated video signals representing images of a rear of said vehicle and transfer said video signals to said multi-scanning video frequency amplifier controller for filtering out interference artifacts and amplifying said video signals, said amplified video signals being sent to said display.

* * * * *